Patented Jan. 15, 1929.

1,699,243

UNITED STATES PATENT OFFICE.

HARVEY B. LEMON, OF CHICAGO, ILLINOIS.

ART OF INCREASING THE ADSORPTIVE POWER OF CHARCOAL.

No Drawing. Application filed August 29, 1921. Serial No. 496,631.

The present invention relates to methods of increasing the adsorptive power of vegetable charcoal, the process being commonly designated as "activation".

I have discovered that the adsorptive power of vegetable charcoal may be increased by adsorbing in the charcoal a gaseous material and effecting its removal at a temperature above 450° C. and not above 900° C. With gaseous materials having low critical temperatures, such as the permanent gases, oxygen, nitrogen, air, etc., it is desirable that the adsorption be promoted by the use of low temperatures, such as that of liquid air, the charcoal being cooled in the presence of the gaseous material. The removal of the gaseous material may then be effected by heating the charcoal to a temperature within the limits set forth, preferably in a high vacuum to make the out-gassing as complete as possible.

With gaseous material having a high critical temperature, such as steam, the adsorption of the material in the charcoal may be effected at higher temperatures, and even in the temperature range 450° C. to 900° C. For evacuation or out-gassing a temperature of 600 to 700° C. is preferred. At such temperatures, in the presence of such gaseous materials as steam, adsorption and out-gassing proceeding simultaneously with the production of the desired change in the character of the charcoal indicated by its increased adsorptive capacity.

In the preparation of adsorptive charcoal by the present process it is preferred that the temperature of carbonization be not above 800° C., and preferably between 600° and 700° C. Charcoals carbonized at temperatures not over 1200° C. may, however, have their adsorptive power markedly improved by the present process.

The following illustrates a specific procedure which may be employed in the activation of the charcoal. The charcoal may be heated in a chamber to the desired out-gassing or evacuating temperautre while evacuating the chamber by means of a pump capable of producing a high vacuum, such as a Gaede pump or a mercury diffusion pump. The out-gassing is continued to substantially complete evacuation, i. e., until the pressure over the charcoal on cooling to room temperature was too low to be read upon a gauge. The charcoal chamber is then cooled to liquid air temperature and placed in communication with a chamber containing a measured volume of air at known pressure. The air is adsorbed and at the same time the rate of drop of its pressure indicates the adsorptive capacity of the charcoal.

Operating in the above described manner, a sample of cocoanut charcoal carbonized at 850° C., and outgassed at 425° C. for six hours, on adsorption, caused a drop from a pressure of 90 cm. to a pressure of .071 cm. in ten minutes. It was then outgassed for 4½ hours at 600°, and in adsorption from an equal volume of air caused a drop from a pressure of 90 cm. to a pressure of .022 cm. in ten minutes. After a third out-gassing at 600° C. for 4½ hours, its increased activity on adsorption was shown by a drop in ten minutes from a pressure of 90 cm. to a pressure of .0028 cm.

Another sample, carbonized for 1½ hours at 875° C., on adsorption, caused a pressure drop in ten minutes from a pressure of 90 cm. to a pressure of 33 cm. After three out-gassings, each at 600° for 4¼ hours, the increase in activity was indicated by a drop in ten minutes from a pressure of 90 cm. to a pressure of 13 cm. After four more similar out-gassings, each preceded by adsorption of air at liquid air temperatures, the drop in ten minutes was from pressure of 90 cm. to pressure of .0056 cm. Subsequent heating to 1200° C. destroyed the adsorptive power of this charcoal.

Another sample, carbonized at 670° C. on out-gassing at 633° C. for 4½ hours, had an efficiency indicated by a drop in ten minutes from a pressure of 90 cm. to a pressure of .00032 cm. On out-gassing at 800° C. its efficiency was slightly decreased. After three out-gassings at temperatures from 800 to 875° C., each preceded by adsorption its efficiency was materially impaired, as indicated by a drop in ten minutes from a pressure of 90 cm. to a pressure of 1.6 cm. The sample was then outgassed at 640° for 4 hours, and showed a marked improvement in adsorptive efficiency, the final pressure dropping to .36 cm. in ten minutes. After five more out-gassings including over 80 hours at temperatures between 500° and 650° C. its original efficiency was restored as shown by a final pressure of .00028 cm. being reached in ten minutes.

I claim:

1. The method of increasing the adsorptive power of vegetable charcoal which comprises adsorbing gaseous material in the charcoal and removing it therefrom at a temperature above 450° C. and below 800° C.

2. The method of increasing the adsorptive power of vegetable charcoal which comprises adsorbing gaseous material in the charcoal and removing it therefrom at a temperature between 600 and 700° C.

3. The method of increasing the adsorptive power of vegetable charcoal which comprises evacuating gaseous material therefrom at a temperature above 450° C. and below 800° C.

4. The method of increasing the adsorptive power of vegetable charcoal which comprises evacuating gaseous material therefrom at a temperature between 600 and 700° C.

5. The method of increasing the adsorptive power of vegetable charcoal which comprises adsorbing permanent gas therein at a temperature substantially 0° C. and evacuating it therefrom at a temperature above 450° C. and below 800° C.

6. The method of increasing the adsorptive power of vegetable charcoal which comprises adsorbing permanent gas therein at a temperature substantially 0° C. and evacuating it therefrom at a temperature between 600 and 700° C.

7. The method of increasing the adsorptive power of vegetable charcoal which comprises adsorbing gaseous material in the charcoal and subsequently removing it therefrom at a temperature above 450° C. and below 800° C. and repeating the sequence of steps.

8. The method of preparing a vegetable charcoal having a high adsorptive power which comprises carbonizing the charcoal below 900° C. and subsequently adsorbing gaseous material in the charcoal and removing it therefrom at a temperature between 450° C. and 800° C.

9. The method of increasing the activity of an active vegetable charcoal which comprises heating such charcoal to a temperature between 500° and 650° C.

10. The method of producing active charcoal which comprises carbonizing vegetable material at 600 to 700° C., adsorbing gaseous material therein at a reduced temperature and removing it therefrom at a temperature above 450° C. and below 900° C.

11. The method of producing active charcoal which comprises carbonizing vegetable material at a temperature not above 1200° C., adsorbing gaseous material therein at a reduced temperature and removing it therefrom at a temperature above 450° C. and below 900° C.

12. The method of producing active charcoal which comprises carbonizing cocoanut shells at below 900° C., adsorbing a permanent gas therein at about liquid air temperature, and heating the charcoal to above 450° C. and below 900° C. while exhausting the gas therefrom.

13. The method of producing active charcoal which comprises applying suction to vegetable charcoal while heating it to a temperature above 450° C. and below 800° C. and subsequently absorbing permanent gas therein at a temperature substantially below 0° C. and again removing such gaseous material by applying suction thereto while heating to a temperature above 450° C. and below 900° C.

HARVEY B. LEMON.